United States Patent [19]

Delaney

[11] Patent Number: 4,963,444

[45] Date of Patent: Oct. 16, 1990

[54] INTERNAL HYDROSTATIC PUMP FOR A MOBILE VEHICLE BATTERY

[75] Inventor: William C. Delaney, Saukville, Wis.

[73] Assignee: Globe-Union Inc., Milwaukee, Wis.

[21] Appl. No.: 358,688

[22] Filed: May 30, 1989

Related U.S. Application Data

[63] Continuation-in-part of Ser. No. 201,042, May 31, 1988, abandoned.

[51] Int. Cl.$^5$ .............................................. H01M 2/38
[52] U.S. Cl. .......................................... 429/67; 429/51
[58] Field of Search .................... 429/51, 67, 70, 81

[56] References Cited

U.S. PATENT DOCUMENTS

| 529,199 | 11/1894 | Schoop | 429/51 |
| 1,376,257 | 4/1921 | Cook | 429/81 |
| 2,739,997 | 3/1956 | Carrick et al. | 429/81 |

Primary Examiner—Donald L. Walton
Attorney, Agent, or Firm—Foley & Lardner

[57] ABSTRACT

A hydrostatic pump for application in a battery experiencing sudden changes in velocity or direction such as in a golf cart. The cells of the battery are provided with hydrostatic pumps using the motion induced surface waves in the electrolyte to develop localized hydrostatic heads and create circulation in the electrolyte. The structure of the pumps additionally nullifies the otherwise detrimental effect of upward surge of electrolyte caused by the same change in velocity or direction.

15 Claims, 5 Drawing Sheets

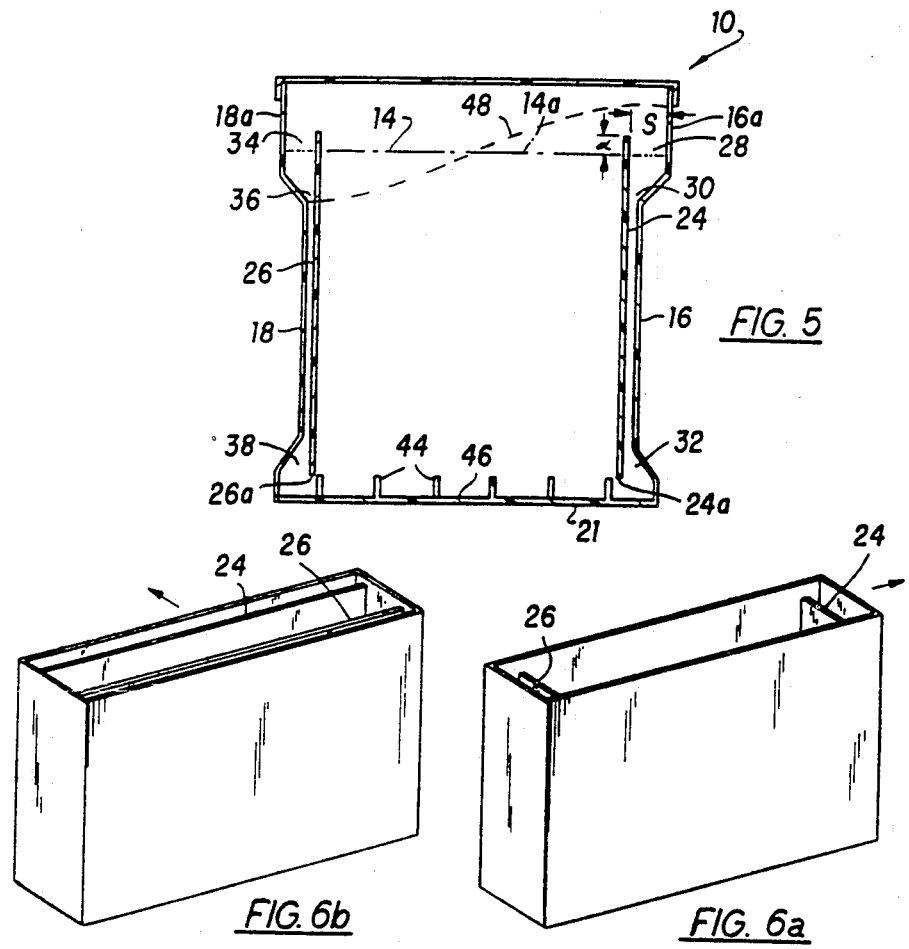
FIG. 5
FIG. 6b
FIG. 6a
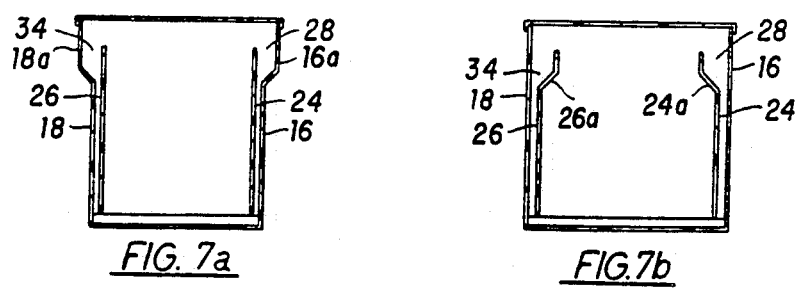
FIG. 7a
FIG. 7b

INTERNAL HYDROSTATIC PUMP FOR A MOBILE VEHICLE BATTERY

This application is a continuation-in-part of U.S. application Ser. No. 201,042 filed May 31, 1988, now abandoned entitled "Internal Hydrostatic Pump For A Mobile Vehicle Battery".

FIELD OF THE INVENTION

This invention relates generally to batteries and more specifically to batteries which benefit from electrolyte circulation.

BACKGROUND OF THE INVENTION

Secondary batteries, such as lead-acid batteries, use a liquid electrolyte which tends to stratify when cycled. The stratification occurs during charge and recharge, affects cell performance and reduces battery life. Additionally, ambient heat and efficient distribution of the internally generated heat are problems where the electrolyte is essentially stagnant. A simple and cost effective technique for gently circulating the electrolyte and increasing the heat transfer efficiency of such a battery has still not been made available.

The prior art is replete with examples of various devices used to circulate electrolyte in secondary batteries or otherwise prevent stratification. U.S. Pat. No. 916,320 issued on Mar. 23, 1909 to H. F. Joel illustrates a technique of tapering a center electrode in a circular battery and slanting the outer conical electrode relative to the separators such that the gas collecting on either side of the separator moves upward and accumulates in ever narrowing passageways, forcing electrolyte as bubbles up through orifices at the top and then over to the outside of the outer electrode where it moves downward. According to the patentee this draws the denser electrolyte from the bottom of the battery. U.S. Pat. No. 2,584,117 issued on Dec. 28, 1949 also recognized the problem and proposed the use of an air blown device to aerate the electrolyte to alter the density thereof to create circulation. Still another U.S. Pat. No. 4,283,467 issued Aug. 11, 1981 to Gutlich, et.al. discloses a device that also utilizes gas to alter electrolyte density. U.S. Pat. No. 4,308,322 issued Dec. 29, 1981 describes a pump within the battery comprising a gas collecting hood and passageways which utilize the generated gas to carry electrolyte as bubbles to the passageways, thus inducing circulation. Another design to reduce stratifiration is disclosed in U.S. Pat. No. 4,619,875 issued to D. W. Stahura, et.al. in which the separator has a plurality of laterally extending concave ribs on the surface thereof that act to trap the more dense electrolyte.

U.S. Pat. No. 529,199 issued Nov. 13, 1894, to Schoop describes the use of a mechanism in a battery which utilizes disturbances occurring in the liquid electrolyte due to movement of the battery to create hydrostatic heads. Once the head is created, the mechanism permits dissipation of the head into currents of electrolyte, thus decreasing stratification and increasing the heat transfer efficiency of the battery. The various mechanisms of the Schoop patent used to create circulation, however, are expensive to manufacture, difficult to assemble, and often require moving parts.

SUMMARY OF THE INVENTION

The invention provides a battery cell equipped with a hydrostatic pump having no moving parts which utilizes movement of the battery, such as when installed in a vehicle, to circulate the liquid electrolyte. In accordance with one embodiment of the present invention, a hydrostatic pump in the form of a partition bridges the side walls of the cell container and is spaced apart from an end wall. The partition, together with the side walls and end walls, defines a head tank having an inlet mouth for receiving overflow from laterally moving surface waves of the electrolyte and a narrow throat which acts as an electrolyte passageway. The throat extends downwardly to a point above the bottom of the cell and communicates with the remainder of electrolyte outside of the pump. The pump utilizes surface waves created in the battery cell electrolyte due to disturbances caused by movement of the vehicle in which the battery is placed. The partition which is traversed by a surface wave of electrolyte traps a portion thereof in the mouth region. This additional electrolyte creates a hydrostatic head therein causing electrolyte to move downward through the throat and then outward into the main body of electrolyte. This movement stimulates flow currents within the electrolyte, reducing electrolyte stratification and increasing heat transfer efficiency.

By proper observance of certain parameters of the pump, the deleterious effect of the upward surge of electrolyte caused by the same exterior forces generating laterally moving surface waves can be minimized without resort to moving check valves and the like. The most important parameters identified are the volume of the mouth region, and the ratio of the average horizontal cross-sectional area of the mouth region to the throat. In a preferred embodiment, the horizontal throat cross-sectional area is maintained as small as practicable along the length of the throat. It has been determined that by maximizing the volume of the head tank and ensuring the aforementioned cross-sectional ratio as above at least 2.5, the effect of upward surge is reduced to a value not affecting the desired operation of the pump.

BRIEF DESCRIPTION OF THE DRAWINGS

A preferred exemplary embodiment of the present invention will hereinafter be described wherein like numerals denote like elements and:

FIG. 5 is a section similar to FIG. 1 without the electrode depicting a wave in the electrolyte filling the pump mouth.

FIG. 6a and 6b depict two orientations of the cell, each arranged most favorably to intercept waves caused by changes in speed and direction, respectively.

FIG. 7a and 7b depict the contrast between the mouth of the hydrostatic pump of the present invention, one of which is formed by a diverging cell side wall and the other by a diverging pump plate.

DETAILED DESCRIPTION OF THE PREFERRED EMBODIMENT

Figure 2:
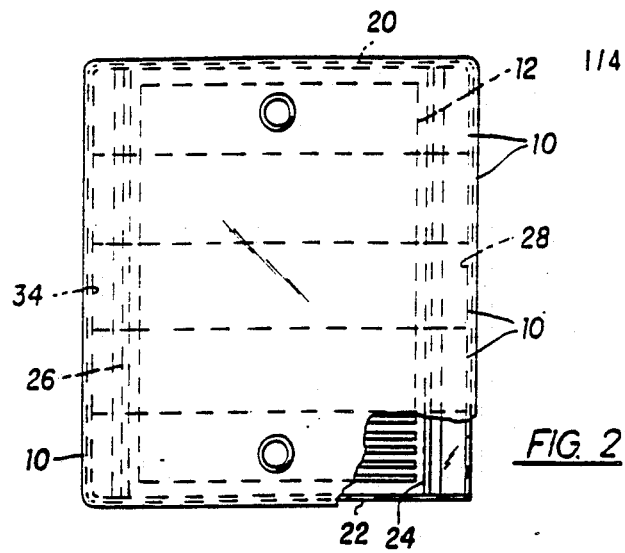
FIG. 2 is a top view of the battery having cells identical to FIG. 1.

A wave is a disturbance propagated in a medium, e.g. a liquid, in such a manner that at any point in the medium the displacement is a function of time while at any point in time the displacement is a function of the position of the point. As the wave passes a region of the medium, the particles of the medium in that region are displaced temporarily but then return to essentially their original position once the wave has passed.

Once generated, a wave will continue moving until dissipated by molecular forces or like or drag forces, the latter resulting from a stationary object lying near or slightly above the surface of the medium. A wave, which is propagated against a surface of a thin width which extends out a short distance above the normal or "at-rest" surface of the medium, will move over the surface, part of the energy of the wave being dissipated against the surface and continue. In the situation where the surface is in close proximity to a vertical surface, the wave will be reflected by the vertical surface causing a secondary wave to be propagated in the opposite direction traversing the thin width surface and continue as a wave of lessened energy, assuming the vertical surface extends above the height of the continuing wave and below the surface a sufficient distance to change the momentum of essentially the entire wave.

Another phenomena closely related to the aforementioned laterally moving surface waves is an upward surge of electrolyte created by the same external force causing the surface waves. When a contained liquid has its velocity changed, the liquid initially impacts against the wall in a direction away from the acceleration on the container. The wall acts to divert the liquid such that a column of liquid is caused to move directly up the side of the wall and then subsides.

The aforementioned surface wave phenomena may be used to vitiate undesired stratification of electrolyte in certain batteries to the extent that the countering phenomena of the upward surge can be minimized. In accomplishing this, the invention has harnessed the energy of waves created in the free electrolyte in a battery employed in a mobile environment, e.g. golf cart vehicles, fork lift trucks or automobiles, when the battery, and therefore the electrolyte, experiences changes in velocity by either variations in the magnitude or direction of the velocity while simultaneously minimizing the undesired effect of upward surge. The energy of the surface waves is employed by the hydrostatic pump in accordance with the present invention to induce a hydrostatic head in a localized region of the electrolyte which dissipates in an underlying electrolyte flow. The otherwise counteracting upward surge of electrolyte is minimized by proper observance of certain dimensional parameters of the pump in a manner described below. The resulting flow reduces stratification of the electrolyte and increases heat transfer efficiency, resulting in the concomitant advantages thereof.

Figure 1:
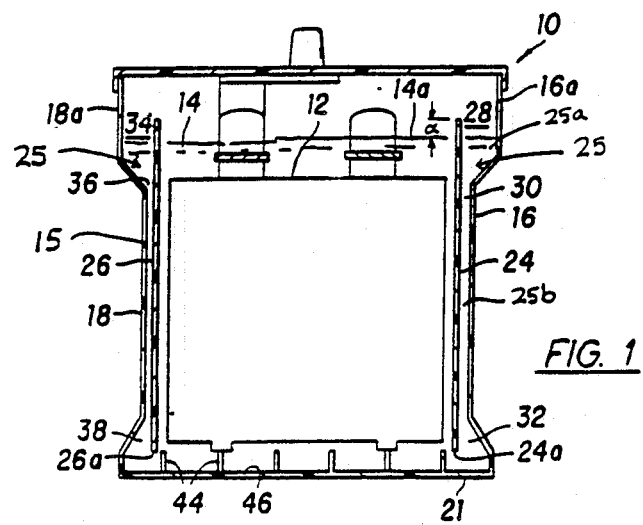
FIG. 1 is a vertical section of a cell of a battery showing a single electrode and a pair of hydrostatic pump elements in accordance with a preferred embodiment of the present invention.

Reference is made to FIG. 1 in which a series of positive and negative electrode elements 12 are positioned within a battery cell 10 and immersed in a liquid electrolyte 14. A pair of hydrostatic pumps 25 are disposed on opposite sides of the series of electrodes 12 laterally offset therefrom. Pumps 25 are constructed as follows. Running generally parallel to and spaced from a side wall 16 of the cell casing 15 is an essentially planar partition (wall) 24 which, as seen in FIG. 2, is secured at each end thereof, respectively, to opposite end walls 20 and 22. A second partition (wall) 26 is similarly parallel and spaced from a side wall 18 and secured at each end thereof to walls 20 and 22. Each partition 24 and 26 extends above and below the surface 14a of electrolyte 14 with the distance above being noted by the letter "d". The surface 14a is a surface of the electrolyte undisturbed by extraneous forces caused by the change in the momentum of the battery and is defined for purposes of this description as the "at-rest surface" of electrolyte 14.

As seen in FIG. 1, wall 16 rapidly diverges away from partition 24 into top portion 16a. The divergence defines a step between a pump mouth (inlet) 28 and narrow throat 30 to subdivide the space between walls 16, 24 into an upper head tank 25a and a lower, narrow flow passage 25b. The step may be inclined as illustrated in FIG. 1 or be essentially horizontal, in other words, perpendicular to walls 16a, 24 of casing 15. As illustrated, FIG. 2 depicts a battery having a plurality of cells 10 (indicated by dashed line across the battery) having mouths 28 and 34 running the longitudinal length thereof. The advantages of using a rapid or abrupt change in the horizontal cross-section area from mouth to throat as supplied by the step structure is described more fully below.

Figure 3:
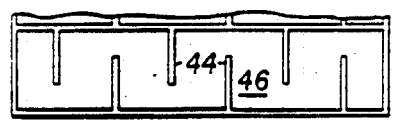
FIG. 3 is a plan view of the bottom surface of the cell of FIG. 1 showing the arrangement of the mud rests.
Figure 4:
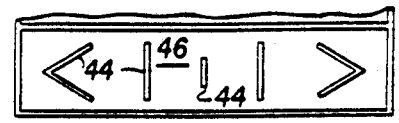
FIG. 4 is a plan view of the bottom surface of a cell similar to FIG. 1 depicting another mud rest arrangement.

Throat 30 ends at an opening (pump outlet) 32 formed between the distal end 24a and the bottom 21 of cell 10. Similarly, partition 26 and the top portion 18a of wall 18 form mouth 34 leading to throat 36 and terminating at opening 38 formed under distal end 26a. As illustrated, however, distal ends 24a and 26a are slightly above mud rests 44 extending as planar walls up from the bottom surface 46 of battery 10 which functions to contain residue falling from the electrodes 12. In a standard battery the mud rests extend across the battery from wall to wall. As best seen in FIG. 3, mud rests 44 are staggered such that any electrolyte current induced along surface 46 may move unimpeded yet prevent significant displacement of the collected mud residue. While the design of mud rests 44 may be any arrangement desired such as shown by the alternate arrangement in FIG. 4, it is preferred to have the geometry of mud rests such that the flow of electrolyte can be directed in a manner most effective for the redistribution of electrolyte.

Reference is now made to FIG. 5 in which electrolyte 14 has been disturbed by linear acceleration, deceleration or change of direction, i.e. angular acceleration of battery container 10. A wave 48 has been formed which has a wave height exceeding distance d and when wave 48 moves against partition 24, a portion of the electrolyte is displaced into the confined region and trapped therein by mouth 28 then becoming filled with electrolyte. The electrolyte within the localized region defined by mouth 28 now has a hydrostatic head relative to the at-rest surface of the electrolyte outside of the localized region and begins to equilibrate itself by forcing electrolyte down throat 30 and out through opening 32. The flow continues until the hydrostatic head no longer exists, i.e. the levels of electrolyte within and without the localized region being the same.

The circulation provided by the hydrostatic head pumps electrolyte less dense into the bottom interior volume of the electrolyte causing a flow of electrolyte to occur. A total redistribution of electrolyte can be affected in this manner depending upon the volume of electrolyte filling mouth 34, the number of waves occurring to provide the volume, and the total volume of electrolyte. For example, if a typical group 24 starting, lighting and ignition (SLI) battery was fitted with a hydrostatic pumps as described with a mouth volume of 6.5 milliliters, i.e., that volume defined by the at-rest surface 14a and the surrounding plate and wall surfaces, and fifty waves a day were experienced, the total electrolyte volume would be redistributed about once every 2.5 days. For batteries where stratification has not yet occurred, the flow tends to prevent electrolyte from stratifying; otherwise stratification which has already occured will be quickly dissipated. The promotion of electrolyte flow also increases internal heat transfer. This in turn improves both battery energy density and battery life since uniform electrolyte distribution improves battery charge and discharge efficiently and reduces electrode grid corrosion caused by localized areas of high density sulfuric acid, and active material shedding.

When a wave crests against a stationary object such as wall 16, a secondary wave is created which moves in the opposite direction. Because the embodiment illustrated in FIGS. 1-3 has a second plate, i.e. plate 26, the secondary wave may have a height above the distance d inducing a hydrostatic head within the confined region defined by mouth 34 and further stimulating circulation of the electrolyte via opening 38.

It is desirable to maximize the volume of the mouth region to the greatest extent possible without interfering with the proper operational parameters (volumetric efficiencies) of the battery cell and the generation of laterally moving surface waves. A large mouth volume provides quicker redistribution of electrolyte and tends to inhibit upward surge of electrolyte as described below. In a typical cell, having a width of approximately 1.6", the pump mouth, in accordance with the preferred embodiment, has essentially the same width as the cell, a height of approximately 0.5", and a "depth", i.e., distance measured from partition 24 to wall 16, of approximately 0.5". In a typical cell, it has been determined that a mouth depth of at least 0.4", preferably 0.5" or larger, should be used. The height of the mouth, i.e., height a, must necessarily have a value which will permit most waves to traverse the plate and yet together with the surrounding walls define a mouth region having the volume necessary to contain sufficient electrolyte to induce an appropriately large hydrostatic head. Thus, the "volume" of the mouth region in the preferred embodiment, essentially a parallelpiped, is defined by its height "a", the cell width, and the mouth depth "s".

In accordance with the preferred embodiments of the present invention, throat 30 is provided with an essentially constant horizontal cross-sectional area. It is advantageous to ensure that the flow path within the throat 30 is as narrow as possible, making the surface area to volume ratio large. When an upward surge of electrolyte occurs, the inside surface area of throat 30 to volume of electrolyte being relatively large creates an increased frictional drag on the upward surge. Thus, in the preferred embodiment, it is preferable that the throat depth, the distance from partition wall 16 to wall 24, be between 0.09" to 0.125".

Another significant parameter identified as important in minimizing upward surge is the change from the relatively small cross-sectional area of the throat to the large cross-sectional area of the mouth. Liquids flowing at one velocity in a pipe line will experience a reduction in flow velocity as it enters into a pipe line of greater cross-sectional area. By maximizing mouth cross-sectional area and minimizing throat cross-sectional area, upward surge is minimized. In embodiments of the present invention, where the horizontal cross-sectional areas of both mouth and throat are essentially constant, it has been determined that a ratio of mouth depth to throat depth of at least about 2.5 is necessary to provide minimal upward surge.

Figure 12:
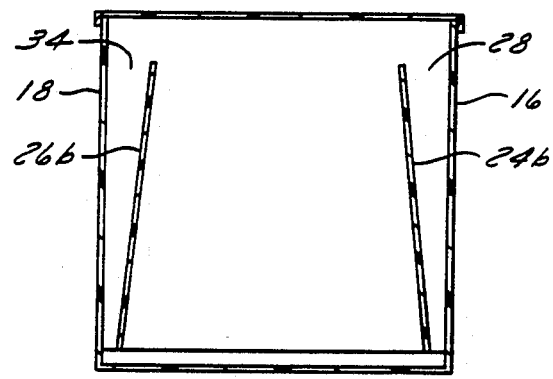
FIG. 12 is a side view of a cell with a tapered pump in accordance with the invention.

In pump structures in which cross-sectional areas are not held essentially constant, such as an embodiment of the present invention illustrated in FIG. 12, wherein partitions 24b, 26b have a constant slope conveying downwardly toward walls 16 and 18, respectively, the mouth to throat depth ratio generally must be larger. For example, it has been determined that for the constant slope of the pump in FIG. 12, the mouth depth measured from the top of partitions 24b, 26b must be at least about three, most preferably 3 to 20, times as great as the throat depth measured from the bottom of partitions 24b, 26b.

Although the dimensions stated above for a specified typical battery cell are admirably suitable to obtain the desired destratification of electrolyte and increase the heat transfer efficiency, other mouth and throat dimensions may be more appropriate for use in other battery cells as long as the pump structure maximizing the mouth volume, minimizing throat volume, and has a sufficiently large mouth to throat ratio to prevent upward liquid surges.

For a particular application, it may be more appropriate to locate the partitions or orientate the battery such that a hydrostatic head is induced when waves of electrolyte are created by sudden angular acceleration of the vehicle as opposed to linear acceleration or deceleration. To accomplish this, the lift gates are oriented substantially perpendicular to the direction of the change since the momentum of the liquid electrolyte will cause the electrolyte to continue to move in that direction. The different arrangements are illustrated in FIGS. 6a and 6b, where FIG. 6a represents the cell oriented for acceleration and 6b represents a cell oriented for change of direction. Alternately, the position of the battery within the vehicle itself can be changed as desired, such that either the angular acceleration due to changes in vehicle direction, linear acceleration or deceleration cause the hydrostatic head to be induced.

Although the preferred embodiment as illustrated in FIG. 1 indicates the top portion 16a of wall 16 diverging away from partition 24, it should be understood that wall 16 may be flat with partition 24 having a diverging portion 24a to form mouth 28. FIGS. 7a and 7b respectively illustrate the divergence of wall 16 and partition 24. In either variation, partition 24 can be either a separate component which may be inserted in grooves formed for that purpose in the side walls of the cell designed with tight tolerence or formed integrally with the side walls.

Still another modification may be obtained by molding a pump into the bottom of the cell or extending it from a removeable top. Such other modifications are possible for desired applications and battery configurations as long as the pump provides the ability to trap electrolyte in a confined region within the cell due to waves in the electrolyte such that a hydrostatic head is created in the confined region and an opening in the pump beneath the surface of electrolyte permits egress of electrolyte into the volume of the cell outside of the confined region.

Figure 8:
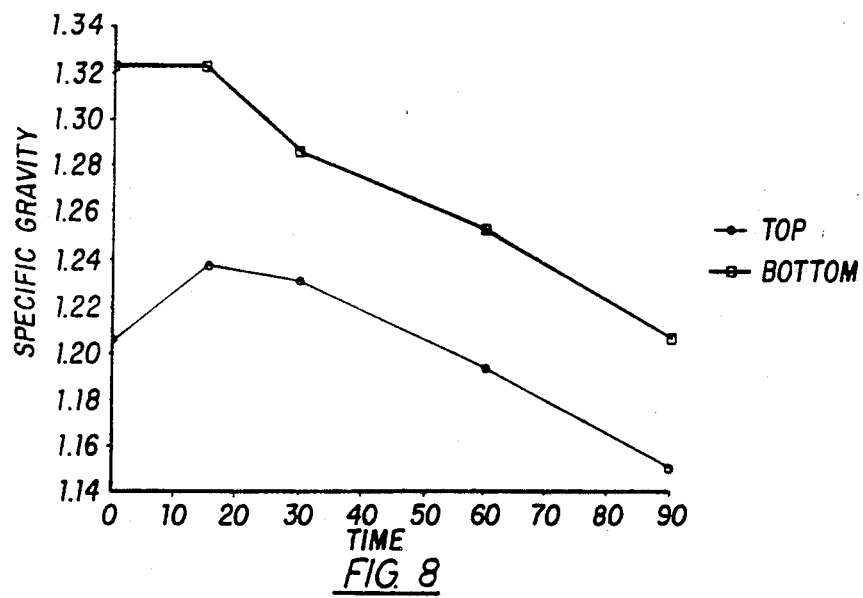
FIG. 8 is a graph depicting the specific gravity of electrolyte at the top with a cell being oscillated over a period of time to simulate start and stop motion.
Figure 9:
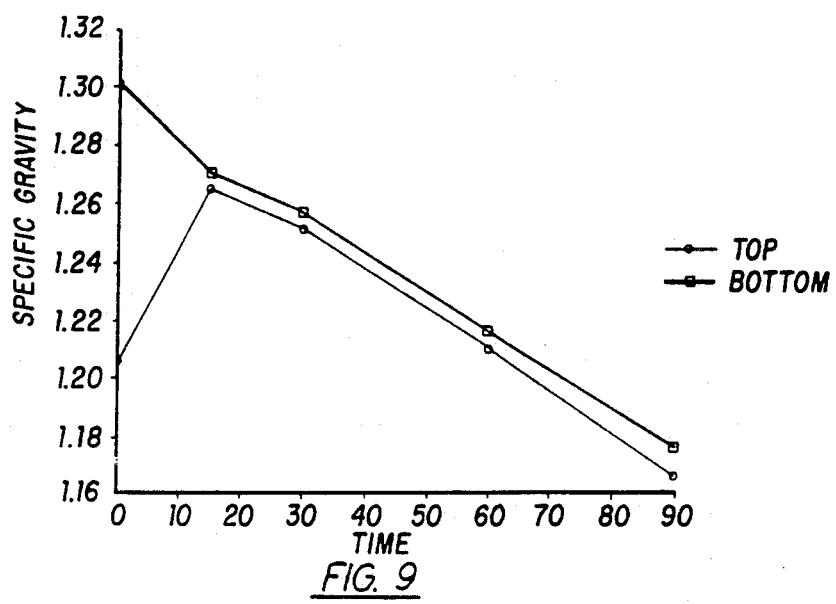
FIG. 9 is a graph similar to FIG. 6 where the identical type cell is retrofitted with a hydrostatic pump in accordance with the present invention.

To clearly demonstrate the efficiency of battery cells incorporating pumps in accordance with the present invention in eliminating stratification within the electrolyte, reference is first made to the graphs of FIGS. 8 and 9. In each instance, a similar battery test cell was employed. Two golf cart batteries were utilized. One battery was modified to a structure shown in FIGS. 1-3 and 5 with hydrostatic pumps at either end. Each of the pumps were self-contained in that each had a front wall which served as the partition wall, a pair of side walls and a back wall. When the pump is placed in a cell, the side and back walls thereof, respectively snugly abut the side and back walls of the cell. The reservoir mouths extended approximately 0.5" above the at-rest electrolyte level and the partition wall of each pump was located approximately 0.5" from the spaced wall of the cell. A test fixture was used that moved each battery back and forth over an 18 inch path once every 20 seconds. Each battery was oriented such that waves produced in the electrolyte moved toward the pump mouths. Each cell was fitted with type T thermocouples immersed approximately $\frac{1}{2}$" to $\frac{3}{4}$" in the electrolyte. Data was collected using a Doric Digitrend Model 220 datalogger connected to a PDP computer. The cover of each cell had a small access port which was closed during the testing but provided an opening for insertion of a small diameter hydrometer suction nozzle. The nozzle was of sufficient length that it could be lowered to any depth of the electrolyte in which to collect samples for determining specific gravity. During a ninety minute discharge period, each cell was subjected to a simulated stop/start motion during the 20 second intervals. In each cell, the specific gravity was measured at both the top and bottom of the cell prior to initiating the start and stop simulation then at the 15, 30, 60 and 90 minute time points. As is clearly seen in FIGS. 8 and 9, significant stratification existed at the start. As the FIG. 8 battery cell was tested, little change occurred in stratification. FIG. 9, however, clearly demonstrates that within 15 minutes, the stratification in the battery cell retrofitted with the hydrostatic pumps decreased by a factor of 9 and essentially ceased to exist. This condition continued until the 90 minute test was completed.

Figure 10:
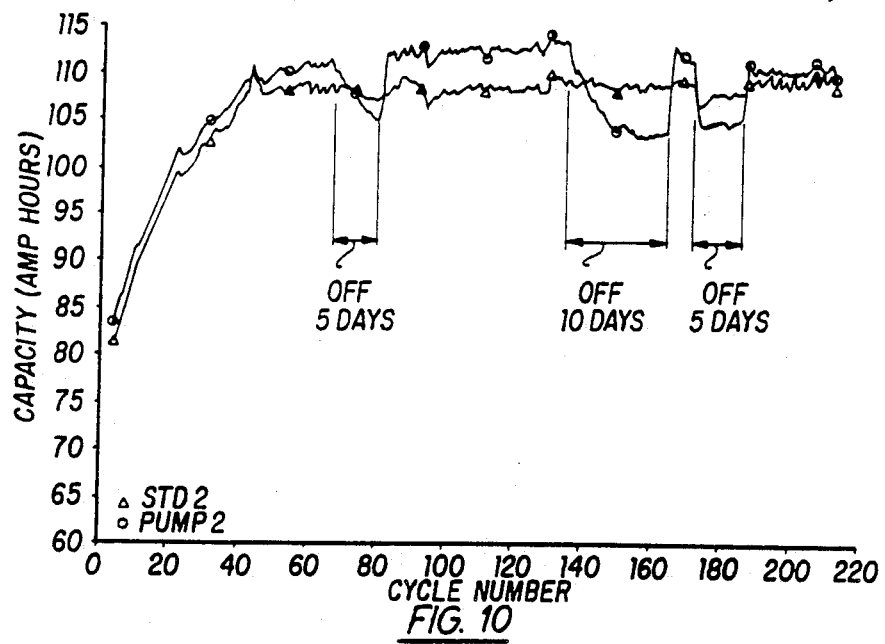
FIG. 10 is a comparison graph showing discharge capacity of a standard battery compared to a battery retrofitted with a hydrostatic pump.

FIG. 10 represents a comparison graph of the aforementioned cells in which the amp hour discharge capacity of each cell was measured against the cycle numbers over a period of approximately 70 days. During certain periods the batteries were permitted to remain motionless. It is clear from the graph that the cell retrofitted with the pumps of the present invention demonstrated a greater discharge capacity when the cells were subjected to the simulated motion. Equally clear is that when the batteries remain motionless, the discharge capacities become essentially the same with the retrofitted pump at times during the motionless period demonstrating poorer performance.

Figure 11:
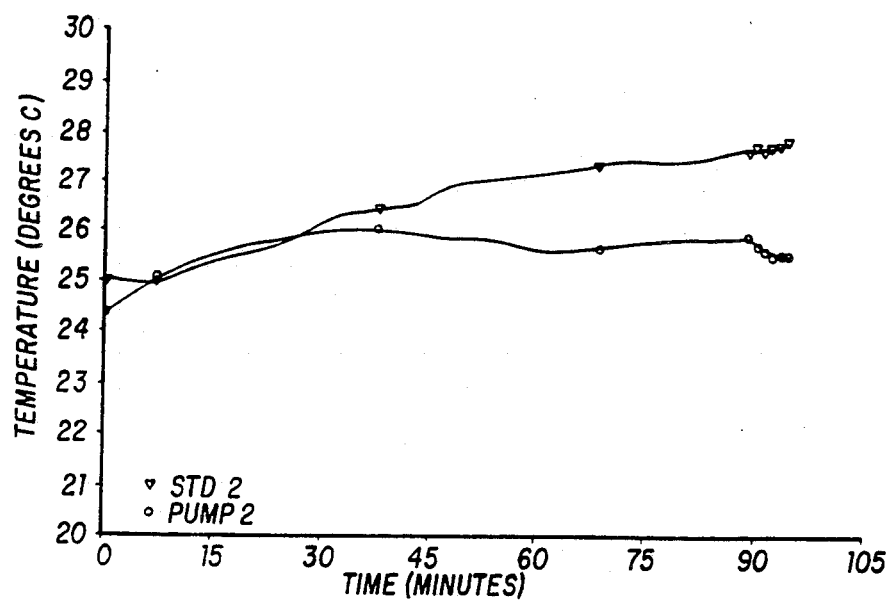
FIG. 11 is a comparison graph contrasting the temperature change of a standard cell to a retrofitted cell over a period of time.

The graph of FIG. 11 compares the measured temperature of each cell as a function of time during a discharge with simulated start and stop cycling. As earlier described, it is desirable to ensure an equilibration of temperature throughout the battery during operation. The circulation of electrolyte in a battery is believed to aid thermal management in a number of ways such as the elimination of excessive overcharge which creates heat, and reduction of peak temperatures within the cell by providing more uniform temperature distribution. The lack of good thermal management may result in accelerated corrosion of grid materials and resulting decrease in the useful life of the battery. As is clearly evident from the graph of FIG. 11, the standard cell demonstrated a continuous increase of temperature rising at a rate of 2.5 times that of the retrofitted cell. At the end of the test, the standard cell demonstrated a temperature of over 2° C. higher.

To further compare the viability of the hydrostatic pump made in accordance with the present invention and a model cell having typical cell dimensions of 7.8" high, 6.5" in length, and 1.6" in width was constructed using transparent material such as plexiglass. To further replicate actual conditions, a formed battery cell elements were placed in the cell.

Two pumps also made of transparent material were constructed. The first was a pump made in accordance with the present invention ("Pump A") with a mouth depth of approximately 0.5" stepped directly to a throat having an essentially constant along its lengh depth of about 0.125". The width of Pump A was made essentially the same as the width of the cell. The ratio of mouth to throat depth was about 4 to 1.

A second pump ("Pump B") was fabricated in which the walls of the pump defining the pump depth were made to converge downwardly from a mouth depth of approximately 0.5" to a throat depth of approximately 0.375" or a taper of about 25% from top to bottom. The ratio of mouth depth to throat separation was about 1.3 to 1. Again, the width of the pump was made essentially the same as the width of the cell.

Initially, the battery cell with Pump A was positioned on an apparatus designed to reciprocate back and forth at adjustable cycles in order to replicate motion which would be experienced by a cell mounted on a mobile vehicle. About 250 milliliters of electrolyte with a specific gravity of 1.325 was poured into the cell. The electrolyte in the cell was then deliberately stratified by pouring milliliters of electrolyte having a specific gravity of 1.10 on top of the underlying heavier electrolyte. The cell was then cycled, periodically stopped and measurements of the specific gravity at the top and bottom of the container were periodically made. After approximately 145 minutes, no discernible difference between top and bottom measurements could be detected which clearly showed that no stratification existed.

Next, identical procedures were employed with Pump B. After 340 minutes, significant differences between top and bottom measurements continued to exist. This illustrates that Pump B was not working to destratify the electrolyte.

To visually determine the effect of the upward surge on each of Pump A and Pump B, the identical procedures as before were implemented with the additional step of adding a visible dye to the electrolyte at the mouth of each pump. Additionally, the cell was also observed without the use of a pump, adding the dye in the region where a pump would have been installed. The cycling action on each cell was video recorded. It was observed that Pump A rapidly diffused the dye throughout the electrolyte. In contrast, the dye in Pump B remained essentially in place and often was thrust upward out of mouth of Pump B into the main body of cell electrolyte. The dye in the cell without any pump reacted similarly to that of Pump B, i.e., remained essentially intact.

The foregoing example essentially confirms the findings stated previously, namely, that without observance of the proper relationship between the mouth and throat depth, a mouth volume of maximized value and a minimal throat depth value, the effect of upward surge essentially nullifies the desired circulatory benefits of creating the hydrostatic head from the laterally moving surface waves. The pump constructed in accordance with the present invention provides this desired benefit without resorting to the use of check valves or the like as taught by the prior art.

It will be understood that the foregoing description is of a preferred exemplary embodiment of the present invention shown. Modifications may be made in design and arrangement thereof within the scope of the present invention, as expressed in the appended claims.

I claim:

1. A battery cell for use in an environment wherein said cell is subject to changes in velocity,
    said cell having a surface substantially enclosing a volume partially filled with electrolyte,
    said cell including a hydrostatic pump having a structure defining a mouth region and a hollow throat, said mouth region positioned substantially above the surface of said electrolyte when at-rest and for receiving electrolyte in the form of laterally moving surface waves when said electrolyte is disturbed by a change of velocity of said cell thereby creating a hydrostatic head within said pump, said throat communicating with said mouth, extending downwardly with an opening at its end into said cell, said throat thereby providing a channel for the dissipation of said hydrostatic head,
    said mouth region having an average horizontal cross-sectional area sufficiently greater than the average horizontal cross-sectional area of said throat such that upward velocity of electrolyte occurring within said throat due to said change of velocity of said cell is substantially reduced upon entering said mouth region.

2. The battery cell of claim 1 wherein the ratio of said mouth region cross-sectional area to said throat cross-sectional area is about at least 2.5.

3. The cell of claim 2 in which said structure includes a first wall extending a predetermined distance above and below the at-rest surface of said electrolyte.

4. The cell of claim 3 in which said cell comprises a front and back wall and a pair of spaced side walls, said first wall being spaced from said back wall and substantially bridging the distance between spaced side walls.

5. The cell of claim 4 in which said structure is substantially encloses said mouth region and further defines a mouth opening for receiving said electrolyte from said waves, said structure being in an abutting relationship with said side walls and back wall of said cell.

6. The cell of claim 4 in which said first wall has a first distal end spaced above said bottom surface defining said opening means.

7. The cell of claim 6 in which one of said first wall and said back wall has a portion thereof above the at-rest surface of said electrolyte which diverge away from a portion of the other of said first wall and said back wall thereby sufficiently defining said mouth region within said structure.

8. The cell of claim 5 in which said first wall is integrally connected to said side walls of said cell and together with said side walls and said back wall define said mouth region and said throat.

9. The battery cell of claim 4, further comprising a pair of the hydrostatic pumps disposed on opposite sides of the casing with the electrodes interposed therebetween.

10. A battery cell including a casing, a liquid electrolyte partially filling the casing, and positive and negative electrodes immersed in the electrolyte, wherein the improvement comprises:
    a hydrostatic pump for circulating electrolyte proximate the upper surface thereof in the casing downwardly to a position proximate a bottom wall of the casing, the pump having
    an inlet mouth positioned above the at-rest upper surface of the electrolyte in the casing to receive overflow of laterally moving waves of the electrolyte which form on the upper surface thereof due to movement of the cell,
    an outlet opening positioned proximate the bottom wall of the tank,
    a tank for receiving the electrolyte overflow and forming a hydrostatic head of the electrolyte above the at-rest level of the electrolyte; and
    a valveless passage filled with the electrolyte for conducting the electrolyte downwardly from the tank to the outlet due to pressure exerted by the hydrostatic head, said valveless passage having average horizontal cross-sectional area sufficiently less than the average cross-sectional area of said tank so as to inhibit upward flow of the electrolyte therein due to the cell movement.

11. The battery cell of claims 10 wherein the ratio of said battery tank cross-sectional area to said passage cross-sectional area is about at least 2.5.

12. The battery cell of claim 10, wherein the hydrostatic pump is disposed adjacent a side wall of the casing at a position laterally offset from the electrodes.

13. The battery cell of claim 11, wherein the tank has a generally rectilinear cross-sectional shape, including a pair of substantially parallel side walls and a bottom wall oriented generally perpendicular to the side walls, and extends lengthwise along a side wall of the casing, the inlet is an open upper end of the tank, and the passage communicates with the tank through an opening in the bottom wall of the tank, the passage having a substantially uniform width which is smaller than the width of the inlet.

14. The battery cell of claim 13, wherein the passage comprises a pair of elongated, planar, parallel inner and outer walls, the inner wall having the outlet therein, and further comprising a mud rest wall parallel and inwardly offset from said inner wall, and positioned to channel flow of said electrolyte upwardly from said outlet opening.

15. The battery cell of claim 11, wherein the tank and the passage comprise respective upper and lower portions of a continuous chamber having a cross-sectional area which diminishes gradually from the inlet to the outlet.

* * * * *